(12) United States Patent
Nemoto et al.

(10) Patent No.: US 11,108,117 B2
(45) Date of Patent: Aug. 31, 2021

(54) SEALED BATTERY, BATTERY MODULE, AND METHOD OF MANUFACTURING BATTERY MODULE

(71) Applicant: TOYOTA JIDOSHA KABUSHIKI KAISHA, Toyota (JP)

(72) Inventors: Yuta Nemoto, Okazaki (JP); Kaito Matsubara, Iwata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 16/218,857

(22) Filed: Dec. 13, 2018

(65) Prior Publication Data

US 2019/0189995 A1 Jun. 20, 2019

(30) Foreign Application Priority Data

Dec. 15, 2017 (JP) .............................. JP2017-240418

(51) Int. Cl.
*H01M 50/502* (2021.01)
*H01M 50/516* (2021.01)
*H01M 50/543* (2021.01)
*H01M 50/15* (2021.01)
*H01M 50/20* (2021.01)
(Continued)

(52) U.S. Cl.
CPC ....... *H01M 50/502* (2021.01); *H01M 50/147* (2021.01); *H01M 50/15* (2021.01); *H01M 50/172* (2021.01); *H01M 50/183* (2021.01); *H01M 50/20* (2021.01);
(Continued)

(58) Field of Classification Search
CPC ...... H01M 2/206; H01M 2/30; H01M 2/1077; H01M 2/043; H01M 2/26; H01M 2/08; H01M 50/50–50/598; H01M 50/172
See application file for complete search history.

(56) References Cited

U.S. PATENT DOCUMENTS

2011/0081572 A1* 4/2011 Byun ..................... H01M 2/26
429/178
2011/0244310 A1* 10/2011 Kim .................... H01M 2/0212
429/158

(Continued)

FOREIGN PATENT DOCUMENTS

| CN | 102034954 A | 4/2011 |
| JP | 2015-8087 A | 1/2015 |

(Continued)

*Primary Examiner* — James Lee
(74) *Attorney, Agent, or Firm* — Sughrue Mion, PLLC (57) ABSTRACT

A sealed battery includes a battery case including a mounting hole, an internal terminal disposed in the battery case and including a shaft portion inserted through the mounting hole, an external terminal disposed on an outside of the battery case and including an insertion hole through which the shaft portion of the internal terminal is inserted, and a gasket and an insulator interposed between the battery case and the internal terminal and between the battery case and the external terminal to insulate the internal terminal and the external terminal from the battery case. The shaft portion of the internal terminal is fastened to the insertion hole of the external terminal. The external terminal includes a raised portion provided around a portion of the external terminal onto which the shaft portion of the internal terminal is fastened.

10 Claims, 7 Drawing Sheets

(51) Int. Cl.
   *H01M 50/147* (2021.01)
   *H01M 50/172* (2021.01)
   *H01M 50/183* (2021.01)
   *H01M 50/528* (2021.01)
   *H01M 50/531* (2021.01)

(52) U.S. Cl.
   CPC ....... *H01M 50/528* (2021.01); *H01M 50/531* (2021.01); *H01M 50/543* (2021.01)

(56) References Cited

U.S. PATENT DOCUMENTS

2014/0377625 A1* 12/2014 Tsutsumi .............. H01M 2/206
                                                                429/121
2016/0336546 A1   11/2016 Dewulf et al.
2018/0130995 A1*   5/2018 Nemoto ................. H01M 2/30

FOREIGN PATENT DOCUMENTS

| JP | 2015-88464 A | 5/2015 |
| JP | 2016-100323 A | 5/2016 |
| JP | 2016-105374 A | 6/2016 |
| JP | 2017-503327 A | 1/2017 |
| WO | 2013/065523 A1 | 5/2013 |

* cited by examiner

SEALED BATTERY, BATTERY MODULE, AND METHOD OF MANUFACTURING BATTERY MODULE

CROSS REFERENCE TO RELATED APPLICATIONS

The present application claims priority from Japanese Patent Application No. 2017-240418 filed on Dec. 15, 2017, which is incorporated by reference herein in its entirety.

BACKGROUND

1. Field of the Invention

The present disclosure relates to a sealed battery, a battery module, and a method of manufacturing a battery module.

2. Description of the Related Art

JP 2016-100323 A discloses a battery in which a current collector connected to an electrode assembly inside a battery case is connected to an external terminal disposed on an outside of a lid attached to the battery case with a rivet joint.

Published PCT Application 2013/065523 proposes a structure in which external terminals are provided with joint regions to which a bus bar is welded and the bus bar is attached to the external terminals by welding. It is also proposed that the regions of the positive electrode external terminal and the negative electrode external terminal that are connected by the bus bar are formed of the same type of metal as the bus bar.

SUMMARY

In order to assure electrical insulation and gas-tight hermeticity, a gasket is interposed between the external terminal and the lid of a battery case. When attaching an external terminal to the lid of the battery case with a rivet joint, the gasket needs to be compressed to retain hermeticity. For this reason, the external terminal is pressed with a high pressing force of about 3000 N, for example, and at the same time, a rivet portion (shaft portion) of a current collector terminal is fastened. In this process, in the case where the external terminal is a flat plate-shaped member including a portion to which a bus bar is attached, pressing the external terminal with a large force may cause deformation in the external terminal. If significant deformation occurs in the external terminal, such deformation results in formation of a gap between the external terminal and the bus bar, which may be a cause of poor welding quality, when welding the bus bar onto the external terminal.

A sealed battery disclosed herein includes a battery case, a internal terminal, a external terminal, and at least one insulating member.

The battery case includes at least one terminal mounting hole. The internal terminal is disposed in the battery case, and includes a shaft portion inserted through the terminal mounting hole. The external terminal is disposed external to the battery case, and includes an insertion hole through which the shaft portion of the internal terminal is inserted. The insulating member is a member that is interposed between the battery case and the internal terminal and between the battery case and the external terminal to insulate the internal terminal and the external terminal from the battery case.

In the sealed battery disclosed herein, the shaft portion of the internal terminal is fastened to the insertion hole of the external terminal. The external terminal includes a raised portion provided around a portion of the external terminal onto which the shaft portion of the internal terminal is fastened. Because the sealed battery as described above includes a raised portion around the portion to which the shaft portion of the internal terminal is fastened, the external terminal is not easily deformed when fastening the shaft portion of the internal terminal.

The external terminal may include a flat plate portion extending along the battery case from the raised portion with the insulating member interposed between the external terminal and the battery case. The external terminal may be formed of a pure aluminum series material having a purity of 99.00% or higher.

A battery module includes a plurality of sealed batteries, each including the flat plate portion extending from the raised portion along the battery case, as described above. The plurality of sealed batteries are arranged so that, in adjacent ones of the sealed batteries, the flat plate portions of the external terminals are aligned with each other. A bus bar is placed to span between the flat plate portions of adjacent ones of the sealed batteries. The bus bar is welded to the flat plate portions.

It is possible that the bus bar and the flat plate portions may be welded to each other so that welded portions penetrate through the bus bar and reaches the flat plate portions. It is possible that at least a portion of the bus bar that is welded to the flat plate portions may be in contact with the raised portions of the external terminals.

A method of manufacturing a battery module disclosed herein may include the steps of preparing a plurality of sealed batteries, arranging the plurality of sealed batteries side by side, and attaching a bus bar to external terminals of the sealed batteries.

Each of the plurality of sealed batteries prepared in the step of preparing includes an external terminal disposed on an outside of a battery case with an insulating member interposed between the external terminal and the battery case. The external terminal includes an insertion hole through which a shaft portion of an internal terminal is inserted and fastened, a raised portion provided around a portion of the external terminal onto which the shaft portion of the internal terminal is fastened, and a flat plate portion extending along the battery case. In the step of arranging a plurality of sealed batteries side by side, the plurality of sealed batteries are arranged side by side so that, in adjacent ones of the sealed batteries, the flat plate portions of the external terminals are aligned with each other. In the step of attaching a bus bar, the bus bar, placed to span between the flat plate portions of the adjacent ones of the sealed batteries, is welded to the flat plate portions.

In the above-described method of manufacturing a battery module, each of the external terminals of the plurality of sealed batteries includes a raised portion provided around a portion of the external terminal onto which the shaft portion of the internal terminal is fastened. Each of the external terminals also includes a flat plate portion extending from the raised portion along the battery case. The bus bar is welded to such a flat plate portion. Therefore, the welding quality between the bus bar and the external terminal is high. Here, it is possible that the bus bar and the flat plate portions may be welded to each other so that welded portions penetrate through the bus bar and reaches the flat plate portions.

In the step of attaching a bus bar, it is possible that the bus bar spanning between the flat plate portions may be positioned by causing the bus bar to come into contact with the raised portions of the external terminals. This allows the bus bar to be easily positioned when fitting the bus bar to the flat portions.

DETAILED DESCRIPTION

Hereinbelow, embodiments of a sealed battery, a battery module, and a method of manufacturing a battery module according to the present disclosure will be described in detail. It should be noted, however, that the embodiments described herein are, of course, not intended to limit the present invention. The present invention is not limited to the embodiments described herein unless specifically stated otherwise. The drawings are depicted schematically and do not necessarily reflect actual objects. The features and components that exhibit the same effects are denoted by the same reference symbols as appropriate, and the description thereof will not be repeated. Arrows designated as U, D, L R, F, and Rr in the drawings represent respective directions, up, down, left, right, front, and rear. For brevity and clarity, reference symbols may be omitted in some detailed drawings, where appropriate.

Hereinbelow, embodiments of a sealed battery and a method of manufacturing a sealed battery will be described by taking a sealed battery 10 shown in FIGS. 1 and 2 as an example.

Figure 1:
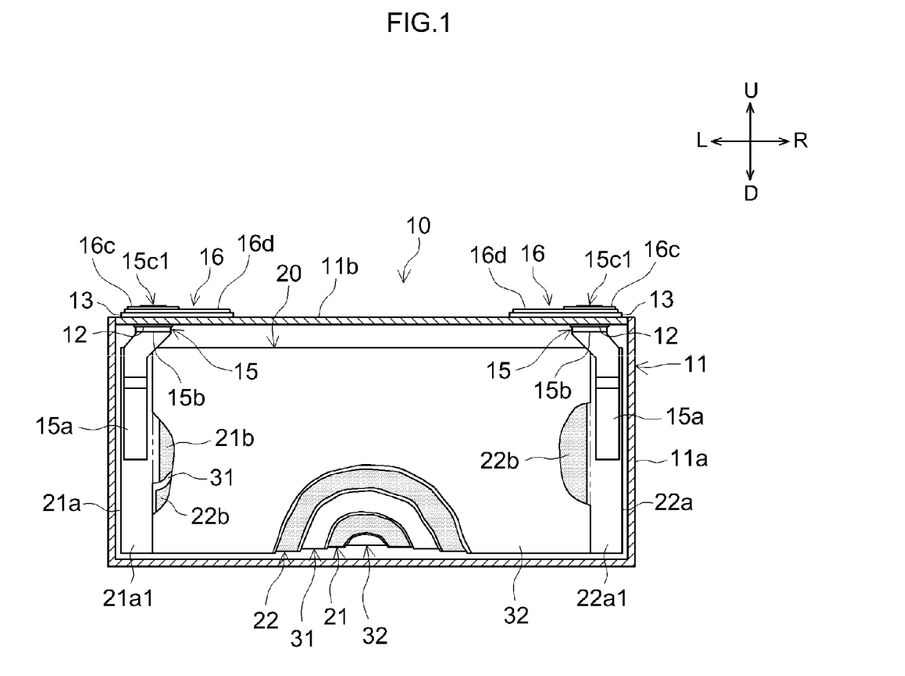
FIG. 1 is a partial cross-sectional view of a sealed battery 10.

FIG. 1 is a partial cross-sectional view of the sealed battery 10. FIG. 1 depicts the interior of the sealed battery 10 that is exposed along one wide side surface of a battery case 11 in substantially a rectangular parallelepiped shape. FIG. 2 is a cross-sectional view illustrating an external terminal 16 and an internal terminal 15 that are fitted to the battery case 11. As illustrated in FIGS. 1 and 2, the sealed battery 10 includes the battery case 11, a gasket 12, an insulator 13, the internal terminal 15, the external terminal 16, and an electrode assembly 20.

Electrode Assembly 20

The electrode assembly 20 is covered with an insulating film (not shown) and is enclosed in the battery case 11. The electrode assembly 20 includes a positive electrode sheet 21 serving as a positive electrode element, a negative electrode sheet 22 serving as a negative electrode element, and first and second separator sheets 31 and 32 each serving as a separator. Each of the positive electrode sheet 21, the first separator sheet 31, the negative electrode sheet 22, and the second separator sheet 32 is a long strip-shaped member.

The positive electrode sheet 21 includes a positive electrode current collector foil 21a (for example, an aluminum foil) having a predetermined width and a predetermined thickness, a positive electrode active material layer 21b containing a positive electrode active material, and an uncoated portion 21a1 defined along one lateral edge of the positive electrode current collector foil 21a with a constant width. The positive electrode active material layer 21b is formed on both faces of the positive electrode current collector foil 21a, except for the uncoated portion 21a1. In a lithium-ion secondary battery, the positive electrode active material is a material that releases lithium ions during charge and absorbs lithium ions during discharge, such as lithium-transition metal composite material. Generally, other than the lithium-transition metal composite material, various materials have been proposed for use as the positive electrode active material, and the positive electrode active material is not limited to a particular material.

The negative electrode sheet 22 includes a negative electrode current collector foil 22a (copper foil herein) having a predetermined width and a predetermined thickness, a negative electrode active material layer 22b containing a negative electrode active material, and an uncoated portion 22a1 defined along one lateral edge of the negative electrode current collector foil 22a with a constant width. The negative electrode active material layer 22b is formed on both faces of the negative electrode current collector foil 22a, except for the uncoated portion 22a1. In a lithium-ion secondary battery, for example, the negative electrode active material is a material that absorbs lithium ions during charge and releases the absorbed lithium ions during discharge, such as graphite. Generally, other than graphite, various materials have been proposed for use as the negative electrode active material, and the negative electrode active material is not limited to a particular material.

Each of the separator sheets 31 and 32 may be formed of, for example, an electrolyte permeable porous resin sheet with required heat resistance. Various proposals have been made about the separator sheets 31 and 32, and there is no particular restriction on the separator sheets 31 and 32.

Here, the negative electrode active material layer 22b is formed, for example, so as to be wider than the positive electrode active material layer 21b. The width of the separator sheets 31 and 32 is wider than the width of the negative electrode active material layer 22b. The uncoated portion 21a1 of the positive electrode current collector foil 21a and the uncoated portion 22a1 of the negative electrode current collector foil 22a are arranged at laterally opposite ends. The positive electrode sheet 21, the first separator sheet 31, the negative electrode sheet 22, and the second separator sheet 32 are aligned longitudinally, stacked one on another, and wound together. The negative electrode active material layer 22b covers the positive electrode active material layer 21b with the separator sheets 31 and 32 interposed therebetween. The negative electrode active material layer 22b is covered with the separator sheets 31 and 32. The uncoated portion 21a1 of the positive electrode current collector foil 21a protrudes from one of the lateral edges of the separator sheets 31 and 32. The uncoated portion 22a1 of the negative electrode current collector foil 22a protrudes from the other one of the lateral edges of the separator sheets 31 and 32.

As illustrated in FIG. 1, the electrode assembly 20 is formed in a flattened shape along one plane containing the winding axis so that it can be enclosed in a case main body 11a of the battery case 11. Along the winding axis of the electrode assembly 20, the uncoated portion 21a1 of the positive electrode current collector foil 21a is disposed at one end, and the uncoated portion 22a1 of the negative electrode current collector foil 22a is disposed at the opposite end. The uncoated portion 21a1 of the positive electrode current collector foil 21a and the uncoated portion 22a1 of the negative electrode current collector foil 22a are attached to respective internal terminals 15, which are respectively attached to opposite longitudinal end portions of a lid 11b. The electrode assembly 20 is attached to the internal terminals 15, which are attached to the lid 11b, in this manner, and is enclosed in the battery case 11.

The battery case 11 has a flat prismatic housing region. The battery case 11 includes the case main body 11a and the lid 11b. The battery case may be made of aluminum or aluminum alloy, such as 1000 series aluminum alloy or 3000 series aluminum alloy. In this embodiment, the case main body 11a has a substantially flat rectangular parallelepiped shape, and it has an opening in one face thereof that has longer sides and shorter sides. The lid 11b is a plate-shaped member that has a shape corresponding to the opening of the case main body 11a so as to be fitted to the opening. At opposite longitudinal end portions of the lid 11b, terminal mounting holes are formed for mounting the external terminals 16 and the internal terminals 15. Herein, each of the terminal mounting holes is a mounting hole 11c (see FIG. 2). In this embodiment, a protrusion 11c1 protruding inward of the lid 11b is provided at the rim of the mounting hole 11c.

Figure 2:
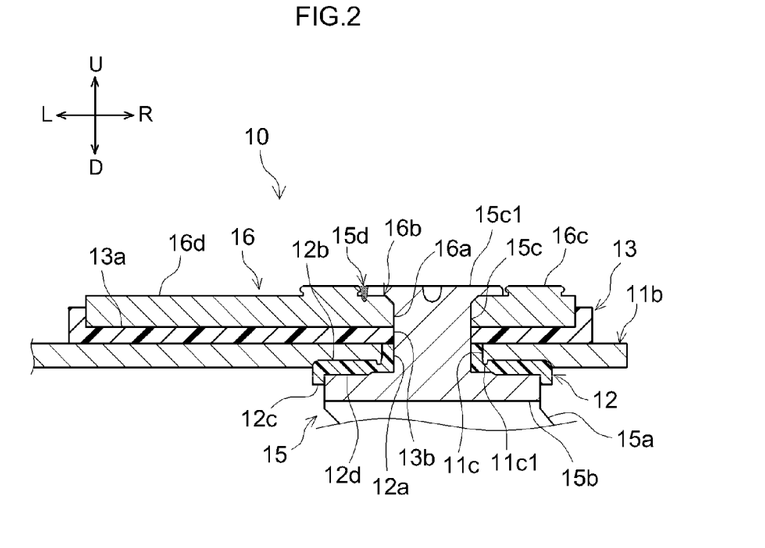
FIG. 2 is a cross-sectional view illustrating an external terminal 16 and an internal terminal 15 that are fitted to a battery case 11.

As illustrated in FIG. 2, the battery disclosed herein includes a battery case component (the lid 11b in this embodiment), internal terminals 15, external terminals 16, and insulating members (12, 13). Herein, the insulating member is a member that is interposed between the battery case 11 (the lid 11b in this embodiment) and the internal terminal 15 and between the battery case 11 and the external terminal 16 to insulate the internal terminal 15 and the external terminal 16 from the lid 11b. It is desirable that the insulating member include at least one member, and the insulating member be interposed between the lid 11b, as the battery case component, and the internal terminal 15, and between the lid 11b and the external terminal 16. In this embodiment, the insulating member includes the gasket 12 and the insulator 13.

Internal Terminal 15

Herein, as illustrated in FIGS. 1 and 2, the internal terminal 15 includes a lead portion 15a, a base portion 15b, and a shaft portion 15c.

As illustrated in FIGS. 1 and 2, the base portion 15b is a portion of the internal terminal 15 that is lapped over the gasket 12 inside the lid 11b. The base portion 15b is attached to the lid 11b with the gasket 12 interposed between the base portion 15b and the lid 11b. The lead portion 15a is a portion of the internal terminal 15 that extends from the base portion 15b toward the inside of the battery case 11. Referring to FIG. 1, the lead portion 15a of the internal terminal 15 that is on the left side is welded to the uncoated portion 21a1 of the positive electrode current collector foil 21a of the electrode assembly 20. The lead portion 15a of the internal terminal 15 that is on the right side is welded to the uncoated portion 22a1 of the negative electrode current collector foil 22a of the electrode assembly 20. The base portion 15b is provided with the shaft portion 15c. The shaft portion 15c is a part of the internal terminal 15 that is to be inserted through a mounting hole 11c of the lid 11b. The shaft portion 15c rises from a central part of the base portion 15b. Herein, the rising part of the shaft portion 15c (that is, the central part of the base portion 15b) may not necessarily be the absolute center of the base portion 15b, and may be off the center of the base portion 15b.

Gasket 12

The gasket 12 is interposed between the internal terminal 15 and the mounting hole 11c of the lid 11b. The gasket 12 guarantees sufficient sealing performance of the mounting hole 11c of the lid 11b and also provides electrical insulation between the lid 11b and the internal terminal 15. The gasket 12 is composed of a resin member having desired elasticity. An example of material usable for the gasket 12 is tetrafluoroethylene-perfluoroalkyl vinyl ether copolymer (also referred to as PFA).

In this embodiment, the gasket 12 includes a tubular portion 12a, a flange portion 12b, a surrounding portion 12c, and a seat portion 12d. The tubular portion 12a is a portion of the gasket 12 that protrudes from the flange portion 12b. The shaft portion 15c of the internal terminal 15 is inserted through the tubular portion 12a. The tubular portion 12a is fitted to the inner circumferential surface of the mounting hole 11c of the lid 11b. The tubular portion 12a is has an inner diameter that is substantially the same size as the outer diameter of the shaft portion 15c of the internal terminal 15 and also has an outer diameter that is substantially the same size as the inner diameter of the mounting hole 11c. The flange portion 12b extends radially from one end of the tubular portion 12a. The flange portion 12b is a plate-shaped member that is to be fitted to the inner side surface of the lid 11b. The surrounding portion 12c extends from the peripheral edge of the flange portion 12b opposite the tubular portion 12a. The seat portion 12d is provided to be the lower surface of the gasket 12. The seat portion 12d includes a recess that corresponds to the shape of the base portion 15b of the internal terminal 15, which will be detailed later. The seat portion 12d is a portion of the gasket 12 on which the base portion 15b is positioned.

As illustrated in FIG. 2, the gasket 12 is fitted to the shaft portion 15c of the internal terminal 15 and is mounted into the mounting hole 11c of the lid 11b. At this time, the shaft portion 15c protrudes from the mounting hole 11c of the lid 11b so that the insulator 13 can be fitted to the outside of the lid 11b.

Insulator 13

The insulator 13 is a member that is disposed on an outside of the lid 11b to provide electrical insulation between the lid 11b and the external terminal 16. The insulator 13 is composed of a resin member. Examples of materials usable for the insulator 13 include polypropylene (also referred to as PP), polypropylene (also referred to as PE), and polyphenylene sulfide (also referred to as PPS).

In this embodiment, the upper surface of the insulator 13 is provided with a recess 13a in which the external terminal 16 is to be mounted. In the recess 13a, a through hole 13b is formed at a position that corresponds to the mounting hole 11c formed in the lid 11b. The through hole 13b has a shape that is substantially the same as or slightly larger than the cross section of the shaft portion 15c of the internal terminal 15 so that the shaft portion 15c can be inserted therethrough. The through hole 13b is fitted onto a part of the shaft portion 15c of the internal terminal 15 that protrudes from the mounting hole 11c of the lid 11b. The insulator 13 is fitted to the outside of the lid 11b with the through hole 13b being fitted onto the shaft portion 15c of the internal terminal 15.

External Terminal 16

As illustrated in FIG. 2, the external terminal 16 is placed on the outside of the lid 11b with the insulator 13 interposed between the external terminal 16 and the lid 11b. Here, FIG.

Figure 3:
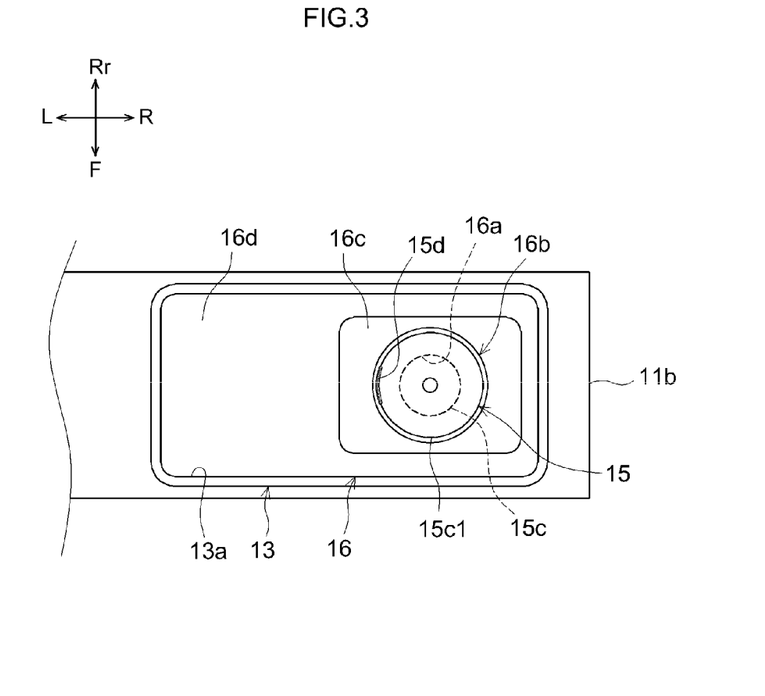
FIG. 3 is a plan view illustrating the external terminal 16 fitted to a lid 11b.
Figure 4:
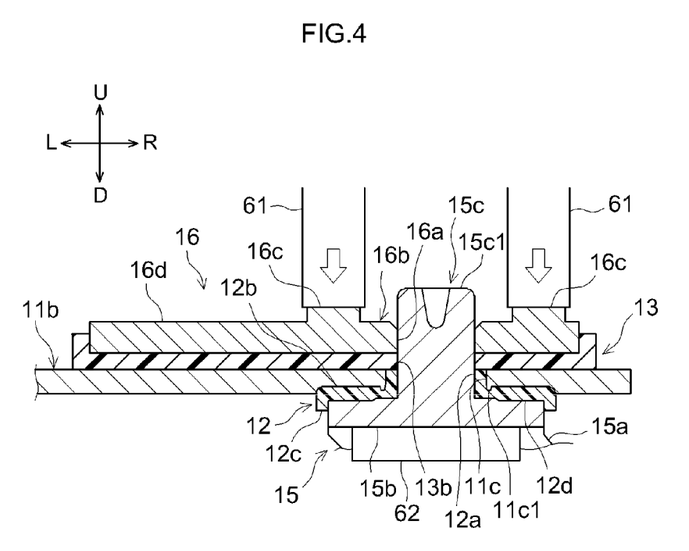
FIG. 4 is a cross-sectional view illustrating a step of fastening a shaft portion 15c of the internal terminal 15 to the external terminal 16.
Figure 5:
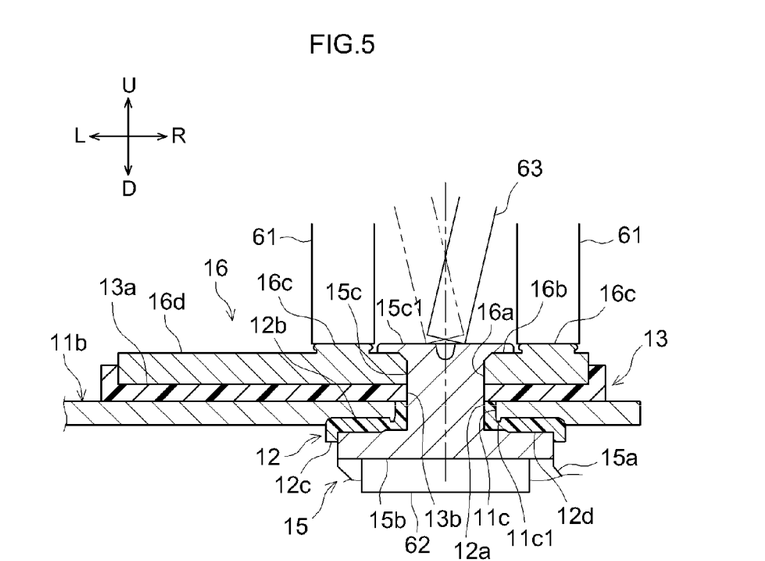
FIG. 5 is another cross-sectional view illustrating the step of fastening the shaft portion 15c of the internal terminal 15 to the external terminal 16.

3 is a plan view illustrating the external terminal 16 fitted to the lid 11b. FIGS. 4 and 5 are cross-sectional views illustrating a step of fastening the shaft portion 15c of the internal terminal 15 to the external terminal 16. FIG. 4 is a cross-sectional view illustrating the internal terminal 15 and the external terminal 16 that are assembled together and pressed by a pair of press heads 61. FIG. 5 is a cross-sectional view illustrating the way in which the shaft portion 15c is fastened to the external terminal 16.

As illustrated in FIGS. 2 and 3, the external terminal 16 includes an insertion hole 16a, a portion 16b onto which the internal terminal 15 is to be fastened, a raised portion 16c, and a flat plate portion 16d.

The insertion hole 16a is a hole through which the shaft portion 15c of the internal terminal 15 is to be inserted, and it is a through hole that penetrates through the external terminal 16.

The portion 16b onto which the internal terminal 15 is fastened is a portion of the external terminal 16 that allows the shaft portion 15c of the internal terminal 15 to be fastened thereon, and it is provided around the insertion hole 16a.

The raised portion 16c is provided around the insertion hole 16a and around the portion 16b onto which the shaft portion 15c of the internal terminal 15 is fastened. In this embodiment, the raised portion 16c is provided around the entire circumference of the portion 16b onto which the shaft portion 15c of the internal terminal 15 is fastened.

The flat plate portion 16d is a portion of the external terminal 16 that extends from the raised portion 16c along the battery case 11 with the insulator 13 as the insulating member interposed between the flat plate portion 16d and the battery case 11, and it is a portion to which a later-described bus bar 81 is to be attached. In this embodiment, the external terminal 16 is disposed on the insulator 13, which is disposed on the outside of the lid 11b, and a bus bar is welded to the flat plate portion 16d.

Here, the lid 11b serving as a battery case component, the gasket 12 and the insulator 13 each serving as an insulating member, the internal terminal 15, and the external terminal 16, which have been prepared in the above-described manner, are prepared.

The lid 11b includes a mounting hole 11c serving as a terminal mounting hole.

The internal terminal 15 includes a shaft portion 15c that is to be inserted through the mounting hole 11c.

The external terminal 16 includes an insertion hole 16a through which the shaft portion 15c is to be inserted, and a raised portion 16c provided around the insertion hole 16a.

Method of Manufacturing Sealed Battery 10

A method of manufacturing a sealed battery may include, for example, a step of fitting the internal terminal 15, a step of fitting the external terminal 16, and a step of fastening the shaft portion 15c to the insertion hole 16a.

In the step of fitting the internal terminal 15, as illustrated in FIG. 4, while the gasket 12 serving as an insulating member is interposed between the internal terminal 15 and the lid 11b serving as the battery case 11, the shaft portion 15c of the internal terminal 15 is inserted through the mounting hole 11c of the lid 11b.

In the step of fitting the external terminal 16, while the insulator 13 serving as an insulating member is interposed between the internal terminal 16 and the lid 11b, the shaft portion 15c is inserted through the insertion hole 16a. Thus, the external terminal 16 is fitted to the internal terminal 15 that is fitted to the lid 11b.

In the step of fastening the shaft portion 15c to the insertion hole 16a, the internal terminal 15 and the raised portion 16c of the external terminal 16 are clamped by a pair of press heads 61 and 62. In this embodiment, the press head 61, which is one of the pair of press heads 61 and 62, is put against the raised portion 16c of the external terminal 16. The other press head 62 is put against the base portion 15b of the internal terminal 15. Such a pair of press heads 61 and 62 clamp the base portion 15b of the internal terminal 15 and the raised portion 16c around the insertion hole 16a of the external terminal 16.

When the pair of press heads 61 and 62 clamp the internal terminal 15 and the external terminal 16, a protrusion 11c1 provided around the mounting hole 11c of the lid 11b is caused to bite into the gasket 12. When the protrusion 11c1 bites into the gasket 12 sufficiently, the load (in other words, the reaction force) acting on the pair of press heads 61 and 62 increases. This means that it is possible to detect that the protrusion 11c1 of the lid 11b has bitten into the gasket 12 sufficiently by detecting the change of the load acting on the pair of press heads 61 and 62 when clamping the internal terminal 15 and the external terminal 16 with the pair of press heads 61 and 62. When the protrusion 11c1 bites into the gasket 12 sufficiently, hermeticity is provided by the gasket 12, and the shaft portion 15c of the internal terminal 15 is inserted sufficiently into the insertion hole 16a of the external terminal 16.

Next, a riveting tool member 63 is pressed against the tip end of the shaft portion 15c to deform the tip end 15c1 of the shaft portion 15c, whereby the shaft portion 15c is fastened to the insertion hole 16a. The shaft portion 15c fastened to the external terminal 16 should preferably be welded to the external terminal 16 at a circumferential edge portion thereof, as illustrated in FIG. 2. A portion 15d of the internal terminal 15, which is obtained by welding a part of the shaft portion 15c to the external terminal 16, locally shows low electrical resistance and can serve as a conductive path between the internal terminal 15 and the external terminal 16.

Here, as illustrated in FIG. 2, the shaft portion 15c of the internal terminal 15 is fastened to the insertion hole 16a of the external terminal 16. The external terminal 16 includes the raised portion 16c provided around the portion 16b of the external terminal 16 onto which the shaft portion 15c of the internal terminal 15 is fastened. As illustrated in FIGS. 4 and 5, when fastening the shaft portion 15c of the internal terminal 15 to the external terminal 16, the internal terminal 15 and the external terminal 16 are clamped by the pair of press heads 61 and 62. In this case, it is desirable that the external terminal 16 include the raised portion 16c and that the press head 61 be brought into contact with the raised portion 16c. When the press head 61 is put against the raised portion 16c, the pressing force from the press heads 61 and 62 is received by the raised portion 16c. As a result, deformation does not easily reach the remaining part of the external terminal 16. In this embodiment, the external terminal 16 includes the flat plate portion 16d, which extends along the lid 11b from the raised portion 16c with the insulator 13 being interposed between the lid 11b and the external terminal 16. Deformation does not easily reach the flat plate portion 16d.

Hereinabove, the sealed battery 10 has been described. In the embodiment shown in FIGS. 2 and 3, the raised portion 16c is raised continuously around the entire circumference of the insertion hole 16a. As mentioned above, the raised portion 16c is a portion of the external terminal 16 against which the press head 61 is pressed, and it serves to prevent deformation from reaching the flat plate portion 16d. From this point of view the raised portion 16c need not be raised continuously around the entire circumference of the insertion hole 16a. For example, the raised portion 16c may be provided intermittently around the insertion hole 16a. It is desirable that the raised portion 16c be provided so as not to interfere with the riveting tool member 63 (see FIG. 5) in the step of fastening the shaft portion 15c of the internal terminal 15 to the external terminal 16. It is also desirable that the raised portion 16c include a flat surface that can receive the pressing surface of the press head 61 that is pressed against the external terminal 16. It is also desirable that the press head 61, which is pressed against the external terminal 16, include a pressing surface that does not interfere with the riveting tool member 63 for fastening the shaft portion 15c of the internal terminal 15 and that can press a wide area of the raised portion 16c. Here, forming the raised portion 16c to be wide serves to reduce the load per unit area that acts on the raised portion 16c of the external terminal 16 and serves to reduce deformation of the external terminal 16, especially deformation of the flat plate portion 16d.

It is also possible that the raised portion 16c may protrude outward from the portion 16b around the insertion hole 16a of the external terminal 16, onto which the shaft portion 15c of the internal terminal 15 is fastened. It is possible that when the raised portion 16c receives a compressive force from the press heads 61 and 62, the raised portion 16c can undergo deformation. For this reason, in order to prevent the raised portion 16c from interfering with the insulator 13, it is possible to provide a required clearance between the wall that rises from the recess 13a of the insulator 13 and the peripheral portion of the external terminal 16. In addition, in the sealed battery 10, the external terminal 16 is raised in a region around the tip end 15c of the shaft portion 15c of the internal terminal 15 that is fastened to the external terminal 16. During the manufacturing process, for example, such a raised portion 16c may serve to circumferentially protect the tip end 15c1 of the shaft portion 15c of the internal terminal 15 that is fastened to the external terminal 16.

Figure 6:
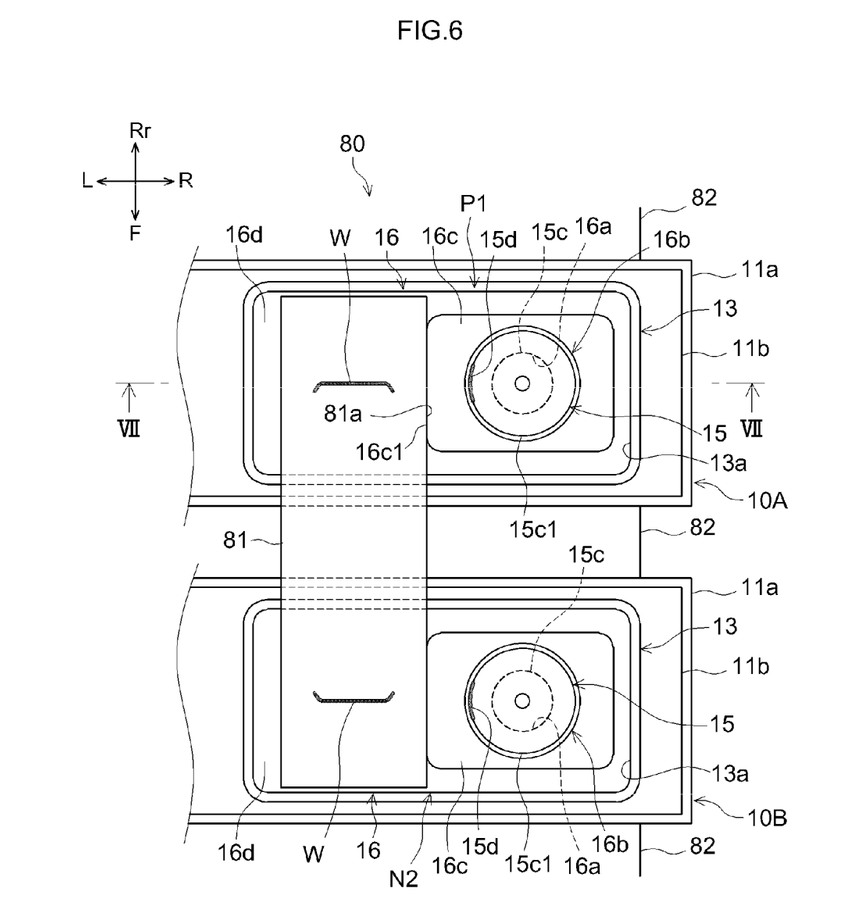
FIG. 6 is a plan view illustrating a battery module 80.
Figure 7:
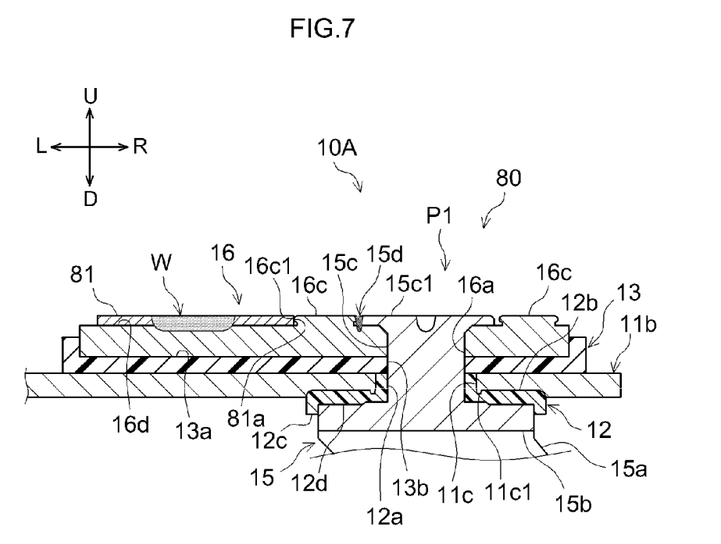
FIG. 7 is a cross-sectional view illustrating the battery module 80.

Next, a battery module 80 employing such a sealed battery 10 will be described. FIG. 6 is a plan view illustrating the battery module 80. FIG. 7 is a cross-sectional view illustrating the battery module 80. FIG. 6 illustrates a joint part of a sealed battery 10A and a sealed battery 10B of the battery module 80, which are adjacent to each other. More specifically, FIG. 6 shows a region in which a positive electrode terminal P1 of the sealed battery 10A and a negative electrode terminal N2 of the adjacent sealed battery 10B are connected to each other by a bus bar 81. Although FIG. 6 shows the sealed battery 10A and the sealed battery 10B of the battery module 80 that are adjacent to each other, the battery module 80 may include a larger number of sealed batteries 10 combined together. FIG. 7 is a cross-sectional view of a portion of the sealed battery 10A at which the positive electrode terminal P1 is attached, which is a cross-sectional view taken along line VII-VII in FIG. 6.

As illustrated in FIGS. 1 and 2, the external terminal 16 of such a sealed battery 10 includes the raised portion 16c provided around the portion 16b thereof onto which the internal terminal 15 is fastened, with the insulator 13 serving as an insulating member interposed between the external terminal 16 and the battery case 11. The external terminal 16 further includes a flat plate portion 16d extending along the battery case 11 from the raised portion 16c. Even when such a flat plate portion 16d is provided, deformation that occurs in the flat plate portion 16d is kept small when fastening the internal terminal 15, because the internal terminal 15 is provided with the raised portion 16c around the portion 16b onto which the internal terminal 15 is fastened.

The battery module 80 includes a plurality of sealed batteries 10 combined together.

A plurality of sealed batteries 10A, 10B, . . . etc., are arranged side by side so that, in adjacent ones of the sealed batteries 10A, 10B, . . . etc., the flat plate portions 16d of their external terminals 16 are aligned with each other. In the present embodiment, spacers 82 (each of the spacers 82 may be a cooling plate provided with a cooling function) are interposed between adjacent ones of the sealed batteries 10A, 10B, . . . etc. that are arranged side by side. The sealed batteries 10 are disposed so that the wide surfaces of their battery cases 11 face each other, and that their lids 11b, each fitted with a positive electrode terminal P1 and a negative electrode terminal N2, face in the same direction. In the example shown in FIG. 6, the orientations of the plurality of sealed batteries 10A, 10B, . . . etc., are set so that the positive electrode terminal P1 and the negative electrode terminal N2 of the respective adjacent sealed batteries 10A and 10B are next to each other.

The bus bar 81 is placed to span between the flat plate portions 16d of the adjacent sealed batteries 10A and 10B. The bus bar 81 is welded to the flat plate portions 16d. Each of the external terminals 16 of the adjacent sealed batteries 10A and 10B is provided with the raised portion 16c around the portion 16b of the external terminal 16 onto which the shaft portion 15c of the internal terminal 15 is fastened. As a result, the flat plate portion 16d of the external terminal 16 is not easily deformed when the shaft portion 15c of the internal terminal 15 is fastened. Therefore, when the bus bar 81 is placed to span between the flat plate portions 16d as illustrated in FIG. 6, a gap does not form easily between the bus bar 81 and the flat plate portions 16d. It may be possible to laser-weld the bus bar 81 to the flat plate portions 16d while pressing the bus bar 81 against the flat plate portions 16d with a jig or the like, for example. The positions at which the bus bar 81 is welded to the flat plate portions 16d are set to be positions where the bus bar 81 is overlapped with the flat plate portions 16d. It is preferable that, as illustrated in FIG. 7, a welded portion W, at which the bus bar 81 and the flat plate portion 16d are welded together, penetrates through the bus bar 81 and reaches the flat plate portion 16d of the external terminal 16.

In the battery module 80, the external terminal 16 fitted on the outside of the battery case 11 is a flat member, and the bus bar 81 is also a flat member. This serves to reduce the space external to the plurality of arranged sealed batteries 10A, 10B, . . . etc. in the battery module 80, and thus serves to reduce the overall size of the battery module 80.

In addition, as illustrated in FIG. 6, it is desirable that at least a portion of the bus bar 81 welded to the flat plate portion 16d be in contact with the raised portions 16c of the external terminals 16. In the embodiment shown in FIG. 6, when placing the bus bar 81 on the flat plate portions 16d, the bus bar 81 may be positioned by causing an edge 81a of the bus bar 81 to come into contact with edges 16c1 of the raised portions 16c of the external terminals 16. By causing the bus bar 81 to come into contact with the raised portions 16c of the external terminals 16 when placing the bus bar 81 on the flat plate portions 16d, positioning of the bus bar 81 relative to the flat plate portions 16d of the external terminals 16 can be performed more easily.

Herein, it is preferable that the method of manufacturing the battery module 80 include the step of preparing a plurality of sealed batteries 10A, 10B, . . . etc., arranging the plurality of sealed batteries 10A, 10B, . . . etc. side by side, and attaching a bus bar 81 to external terminals 16 of the sealed batteries 10A, 10B, . . . etc.

Each of the sealed batteries 10A, 10B, . . . etc. prepared herein includes an external terminal 16 disposed on an outside of the battery case 11 with an insulating member interposed between the external terminal 16 and the battery case 11. Furthermore, the external terminal 16 includes the insertion hole 16a through which the shaft portion 15c of the internal terminal 15 is inserted and fastened, the raised portion 16c provided around the portion 16b of the external terminal 16 onto which the shaft portion 15c of the internal terminal 15 is fastened, and the flat plate portion 16d extending along the battery case 11.

In the step of arranging the plurality of sealed batteries 10A, 10B, . . . etc. side by side, the plurality of sealed batteries 10A, 10B, . . . etc. are arranged side by side so that, in adjacent ones of the sealed batteries 10A, 10B, . . . etc., the flat plate portions 16d of their external terminals 16 are aligned with each other.

In the step of attaching the bus bar 81, the bus bar 81 is placed to span between the flat plate portions 16d of the adjacent sealed batteries 10A and 10B, and further, the bus bar 81 is welded to the flat plate portions 16d. In this step, it is desirable that the bus bar 81 placed to span between the flat plate portions 16d be positioned by causing the bus bar 81 to come into contact with the raised portions 16c of the external terminals 16. This facilitates the positioning of the bus bar 81 relative to the external terminals 16. It should be noted that, although this embodiment describes that the bus bar 81 is brought into contact with the raised portions 16c of the external terminals 16 from the viewpoint of facilitating the positioning of the bus bar 81 relative to the external terminal 16, the battery module 80 is not necessarily limited to such an embodiment unless otherwise stated. For example, the bus bar 81 may not be in contact with the raised portions 16c of the external terminals 16.

Moreover, the bus bar 81 should desirably be welded to the external terminals 16, but the positions to be welded and the method of welding are not limited to the above-described example. As described above, each of the external terminal 16 is provided with the raised portion 16c around the portion 16b of the external terminal 16 onto which the shaft portion 15c of the internal terminal 15 is fastened. The raised portion 16c serves as a portion against which the press head 61 is to be pressed when fastening the shaft portion 15c of the internal terminal 15. Because such a portion against which the press head 61 is to be pressed is raised, deformation does not easily reach the flat plate portion 16d extending from the raised portion 16c. Therefore, a gap does not easily form between the flat plate portions 16d and the bus bar 81 placed on the flat plate portions 16d. Even if a gap forms between the bus bar 81 and the flat plate portions 16d, the gap should be very small. Therefore, such a gap disappears when the bus bar 81 is pressed against the flat plate portions 16d when welding the bus bar 81 to the flat plate portions 16d. As a result, even when the bus bar 81 and the flat plate portions 16d are welded to each other so that welded portions penetrate through the bus bar 81 placed on the flat plate portions 16d, the bus bar 81 is welded to the flat plate portions 16d appropriately, so high welding quality is obtained between the flat plate portions 16d and the bus bar 81.

It is desirable that the external terminals 16 and the internal terminals 15 of the sealed batteries 10A, 10B, . . . etc. are made of the materials that can withstand the potentials respectively required for the positive electrode and the negative electrode. For example, for the internal terminal 15 and the external terminal 16 of the positive electrode, it is possible to use aluminum or aluminum alloys, such as 1000 series aluminum alloys, 3000 series aluminum alloys, and 6000 series aluminum alloys. For the internal terminal 15 and the external terminal 16 of the negative electrode, it is possible to use copper or copper alloys, such as 1000 series copper alloys. As illustrated in FIGS. 6 and 7, in the sealed batteries 10A, 10B, . . . etc., the bus bar 81 is welded to their external terminals 16. For this reason, it is desirable that the external terminal 16 is made of a material that is suitable to be welded with the bus bar 81. From this viewpoint, it is desirable that a 1000 series aluminum alloy, that is, a pure aluminum series material having a purity of 99.00% or higher, be used for the external terminal 16 of the positive electrode.

It is also desirable that a 1000 series aluminum alloy, for example, be used for the internal terminal of the positive electrode. This allows the internal terminal of the positive electrode to obtain good formability in fastening and to be welded to the external terminal in good condition.

It is also desirable that a 1000 series copper alloy, for example, be used for the internal terminal of the negative electrode. This allows the internal terminal of the negative electrode to be joined to the negative electrode current collector foil of the electrode assembly in good condition.

It is also desirable that, for example, a 1000 series aluminum alloy or a clad material of aluminum and copper be used for the external terminal of the negative electrode. This allows the external terminal of the negative electrode to welded to the bus bar in good condition. However, when a 1000 series aluminum alloy is used for the external terminal of the negative electrode, the portion thereof fastened to the internal terminal of the negative electrode requires Cu—Al welding appropriately.

It is also desirable that a 1000 series aluminum alloy, a 3000 series aluminum alloy, or a 5000 series aluminum alloy be used for the bus bar. This allows the bus bar to be welded to the external terminal which is made of aluminum. This also serves to reduce the weight of the battery module.

Thus, a method of manufacturing a sealed battery of this disclosure includes the steps of preparing a battery case, preparing an internal terminal, preparing an external terminal, preparing at least one insulating member, fitting the internal terminal, fitting the external terminal, and fastening a shaft portion of the internal terminal into an insertion hole.

The step of preparing a battery case prepares a battery case including a terminal mounting hole. The step of preparing an internal terminal prepares an internal terminal including a shaft portion that is to be inserted through the terminal mounting hole. The step of preparing an external terminal prepares an external terminal including an insertion hole through which the shaft portion of the internal terminal is inserted and a raised portion provided around the insertion hole. The step pf preparing at least one insulating member prepares at least one insulating member interposed between the battery case and the internal terminal and between the battery case and the external terminal, the insulating member electrically insulating the battery case from the internal terminal and the external terminal.

In the step of fitting the internal terminal, the internal terminal is fitted to the battery case by inserting the shaft portion through the terminal mounting hole while interposing the insulating member between the battery case and the internal terminal.

In the step of fitting the external terminal, the external terminal is fitted to the internal terminal fitted to the battery case by causing the shaft portion to be inserted through the insertion hole while interposing the insulating member between the battery case and the external terminal.

In the step of fastening the shaft portion of the internal terminal to the insertion hole, the internal terminal and the raised portion of the external terminal are clamped by a pair of press heads, and a riveting tool member is pressed against the shaft portion of the internal terminal, to thereby fasten the shaft portion of the internal terminal to the insertion hole.

According to the method of manufacturing a sealed battery as described above, the external terminal is not easily deformed because a press head is pressed against the raised portion of the external terminal when fastening the shaft portion of the internal terminal to the insertion hole.

Various embodiments of the battery and the method of manufacturing a battery module have been described hereinabove according to the present disclosure. Unless specifically stated otherwise, the embodiments of the battery and the method of manufacturing the battery described herein do not limit the scope of the present invention.

For example, unless otherwise stated, the structure of the battery case and that of the electrode assembly are not limited to those described in the foregoing embodiments.

In the foregoing embodiments, the internal terminal 15 and the external terminal 16 are mounted to the lid 11b, which is a component of the battery case. However, depending on the structure of the battery case, this is not necessarily the case. More specifically, the portion of the battery case to which the internal terminal and the external terminal are mounted is not limited to the lid. For example, it is also possible that the internal terminal and the external terminal may be mounted to the case main body in which the electrode assembly is enclosed. Although the foregoing embodiments show the gasket 12 and the insulator 13 as examples of the insulating member, the insulating member is not limited thereto and should desirably be interposed between the internal terminal 15 and a battery case component and between the external terminal 16 and the battery case component.

What is claimed is:

1. A sealed battery comprising:
   a battery case including at least one terminal mounting hole;
   an internal terminal disposed inside the battery case, and including a shaft portion inserted through the terminal mounting hole;
   an external terminal disposed on an outside of the battery case, and including an insertion hole through which the shaft portion of the internal terminal is inserted; and
   at least one insulating member interposed between the battery case and the internal terminal and between the battery case and the external terminal, the insulating member electrically insulating the battery case from the internal terminal and the external terminal, wherein:
   the shaft portion of the internal terminal is fastened to the insertion hole of the external terminal, and the shaft portion of the internal terminal is in direct contact with the insertion hole of the external terminal; and
   the external terminal includes a raised portion provided around a portion of the external terminal onto which the shaft portion of the internal terminal is fastened,
   wherein an exposed surface of the external terminal includes a flat plate portion extending along the battery case in a direction away from the raised portion and the shaft portion, so that the raised portion is located between the shaft portion and the flat plate portion, and the insulating member is interposed between the external terminal and the battery case.

2. The sealed battery according to claim 1, wherein the external terminal of a positive electrode is formed of a pure aluminum series material having a purity of 99.00% or higher.

3. The sealed battery according to claim 1, wherein the portion of the external terminal is directly fastened to the shaft portion by a weld.

4. The sealed battery according to claim 1, wherein the raised portion of the external terminal completely surrounds the shaft portion fastened to the external terminal.

5. A battery module comprising:
   a plurality of sealed batteries each comprising:
   a battery case including at least one terminal mounting hole;
   an internal terminal disposed inside the battery case, and including a shaft portion inserted through the terminal mounting hole;
   an external terminal disposed on an outside of the battery case, and including an insertion hole through which the shaft portion of the internal terminal is inserted; and
   at least one insulating member interposed between the battery case and the internal terminal and between the batter case and the external terminal, the insulating member electrically insulating the battery case from the internal terminal and the external terminal, wherein:
   the shaft portion of the internal terminal is fastened to the insertion hole of the external terminal, and the shaft portion of the internal terminal is in direct contact with the insertion hole of the external terminal; and
   the external terminal includes a raised portion provided around a portion of the external terminal onto which the shaft portion of the internal terminal is fastened,
   wherein the external terminal includes a flat plate portion extending along the battery case in a direction away from the raised portion and the shaft portion, so that the raised portion is located between the shaft portion and the flat plate portion, and the insulating member is interposed between the external terminal and the battery case, wherein:
   the plurality of sealed batteries are arranged so that, in adjacent ones of the sealed batteries, the flat plate portions of the external terminals are aligned with each other,
   a bus bar is placed to span between the flat plate portions of the adjacent ones of the sealed batteries; and
   the bus bar is welded to the flat plate portions.

6. The battery module according to claim 5, wherein the bus bar and the flat plate portions are welded to each other so that welded portions penetrate through the bus bar and reaches the flat plate portions.

7. The battery module according to claim 5, wherein at least a portion of the bus bar that is welded to the flat plate portions is in contact with the raised portions of the external terminals of the adjacent ones of the sealed batteries.

8. The battery module according to claim 6, wherein at least a portion of the bus bar that is welded to the flat plate portions is in contact with the raised portions of the external terminals of the adjacent ones of the sealed batteries.

9. A method of manufacturing a battery module, comprising the steps of;
   preparing a plurality of sealed batteries, each of the plurality of sealed batteries comprising: a battery case including at least one terminal mounting hole; an internal terminal disposed inside the battery case, and including a shaft portion inserted through the terminal mounting hole; an external terminal disposed on an outside of the battery case, and including an insertion hole through which the shaft portion of the internal terminal is inserted; and at least one insulating member interposed between the battery case and the internal terminal and between the battery case and the external terminal, the insulating member electrically insulating the battery case from the internal terminal and the external terminal, wherein: the shaft portion of the internal terminal is fastened to the insertion hole of the external terminal, and the shaft portion of the internal terminal is in direct contact with the insertion hole of the external terminal; and the external terminal includes a raised portion provided around a portion of the external terminal onto which the shaft portion of the internal terminal is fastened, and a flat plate portion on an exposed surface of the external terminal, extending along the battery case from the raised portion with the insulating member interposed between the external terminal and the battery case wherein the raised portion is located between the shaft portion and the flat plate portion;

arranging the plurality of sealed batteries side by side; and attaching a bus bar to the external terminals of adjacent ones of the plurality of sealed batteries, wherein:

the step of arranging includes arranging the plurality of sealed batteries side by side so that, in the adjacent ones of the sealed batteries, the flat plate portions of the external terminals are aligned with each other, and the step of attaching a bus bar includes welding the bus bar, placed to span between the flat plate portions of the adjacent ones of the sealed batteries, to the flat plate portions.

10. The method of manufacturing a battery module according to claim 9, wherein, in the step of attaching a bus bar, the bus bar spanning between the flat plate portions is positioned by causing the bus bar to come into contact with the raised portions of the external terminals.

* * * * *